Figure 1:
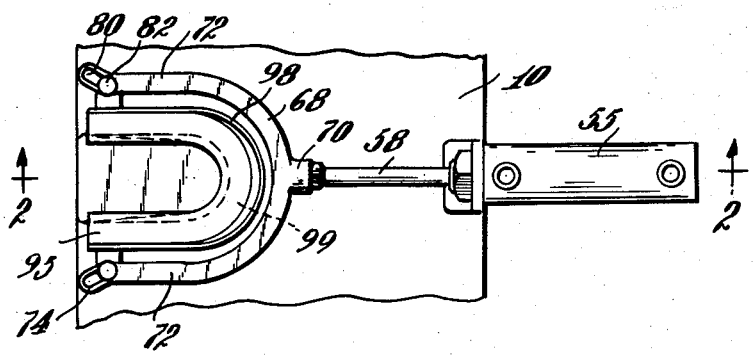

Dec. 31, 1963   J. S. KAMBORIAN   3,115,651
METHOD AND APPARATUS FOR HEATING SHOE STIFFENERS
Filed Feb. 21, 1961   2 Sheets-Sheet 1

INVENTOR.
Jacob S. Kamborian
BY Albert Gordon
ATTY

Dec. 31, 1963   J. S. KAMBORIAN   3,115,651
METHOD AND APPARATUS FOR HEATING SHOE STIFFENERS
Filed Feb. 21, 1961   2 Sheets-Sheet 2

INVENTOR.
Jacob S. Kamborian
BY Albert Gordon
ATTY

United States Patent Office 3,115,651
Patented Dec. 31, 1963

3,115,651
METHOD AND APPARATUS FOR HEATING SHOE STIFFENERS
Jacob S. Kamborian, 133 Forest Ave., West Newton, Mass.
Filed Feb. 21, 1961, Ser. No. 90,874
19 Claims. (Cl. 12—146)

In pending application Serial No. 80,919, filed January 5, 1961, there is disclosed a method of heel seat lasting and counter molding that includes the step of heating a counter while it is positioned in a pocket formed between a shoe upper and a liner secured to the upper. While it is heated, a portion of the counter is concealed in the pocket and the remainder of the counter projects from the liner and is exposed. The counter material has the characteristic of being rigid at ambient temperatures, becoming soft or flaccid when heated to a predetermined temperature, and returning to its normal rigid condition when cooled below said temperature. The counter is coated with an adhesive that is non-tacky at normal temperatures and becomes tacky when heated to said predetermined temperature. In accordance with the method of the aforesaid pending application, after the counter is heated, it is placed with the upper on a last, the upper is subjected to certain pulling stresses, the upper and counter are clamped against the last, and the lasting margin of the upper and counter are wiped to fold them down against an insole secured to the last bottom and adhesively bond them to the insole. After the wiping operation, the cooling of the counter causes it to revert to its rigid state.

It has been discovered that applying a heated surface directly to the exposed counter portion has deleterious effects on the counter as it tends to adversely affect the adhesive coated thereon and irrevocably distort the counter material itself. On the other hand, applying a solid heated surface to the liner to thereby heat the counter portion behind the liner by conduction has produced satisfactory results.

The main object of this invention is to provide a method and apparatus for efficiently and effectively heating the counter material in such a manner that the counter will be heated to the temperature necessary to soften it for a sufficient length of time without incurring any of the undesirable results referred to above. While the present disclosure describes a counter associated with the quarter portion of the upper to provide a stiffener at the heel portion of the shoe, the invention may obviously be used in connecting with softening a toe stiffener inserted in the vamp portion of the upper to provide a stiffener at the toe portion of the shoe. Other objects will become apparent upon reading the detailed description and claims set forth below.

The method of this invention is carried out by bringing a surface of a heated block against the liner to thereby heat the stiffener portion behind the liner, apply heated air to the exposed portion of the stiffener, and, concomitantly with the application of air, clamp the liner, upper and stiffener against the block surface for a predetermined length of time. After the lapse of said predetermined length of time the clamping pressure is released and, concomitantly with the release of the pressure, the application of heated air is terminated. Instead of air, any suitable heated gaseous media may obviously be used to heat the exposed stiffener portion.

The apparatus of this invention comprises a heated block having a convex surface adapted to contact the liner, a step above the convex surface, a plurality of air ports in the step, ducts interconnecting the ports and the block exterior and a connection between the ducts and a source of air pressure to enable air to be forced through the block, be heated during its travel through the block, and emerge from the ports to heat the exposed stiffener portion.

A clamping pad driven by the piston rod of an air operated motor is provided to clamp the work against the block. The pad is a U-shaped member whose legs are secured to a U-shaped spring so that the pad legs are normally urged apart. A lost motion connection is interposed between the pad legs and the piston rod so that when the pad approaches the block the bight of the pad will first contact the block after which the lost motion connection will cause the pad legs to overcome the spring force and be brought against the block.

The pad has a ledge to bend the upper and the exposed stiffener portion and thereby form a crease when the pad is brought against the block. The pad also has a shield to cover the space above the step when the pad is brought against the block and thereby entrap the air emerging from the ports and impinging against the exposed stiffener portion.

An electro pneumatic control is provided to operate the apparatus. The control includes a valve that supplies air to the pad driving motor and to the block. The control is so constructed that when a switch is closed the motor is operated to move the pad against the block and air is forced through the block, and after a predetermined time interval the motor is operated to retract the pad and the air to the block is shut off.

Figure 2:
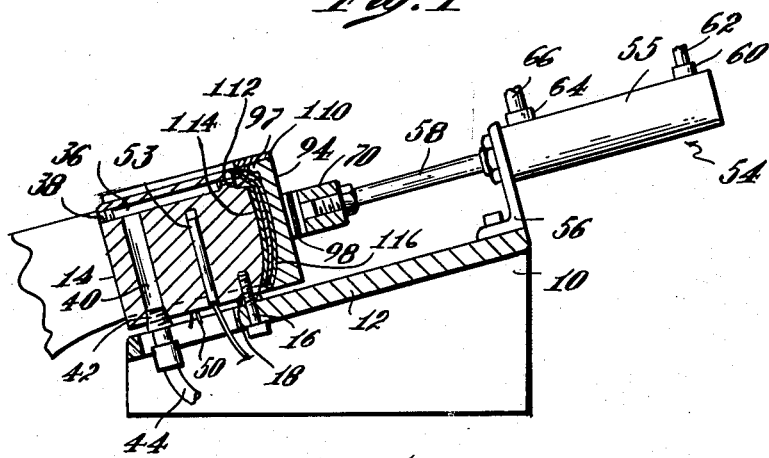
Figures 3, 4, 5:
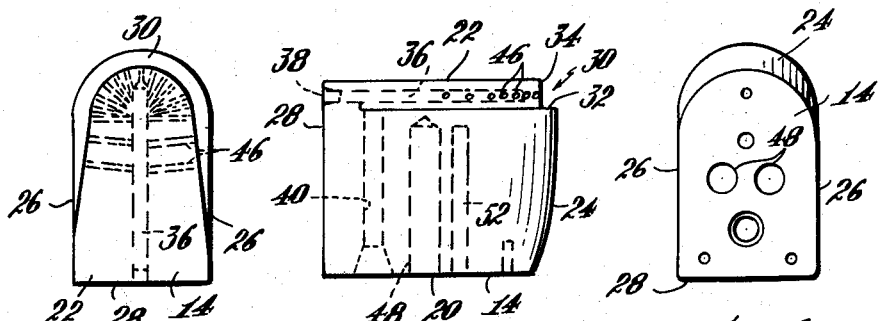
Figure 6:
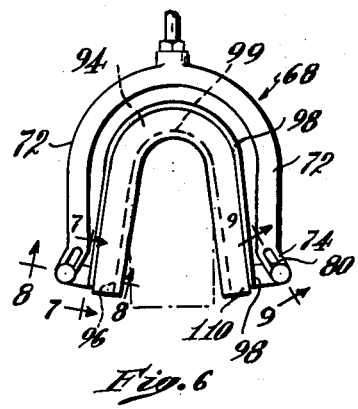
Figure 7:
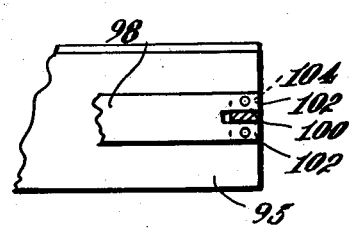
Figure 8:
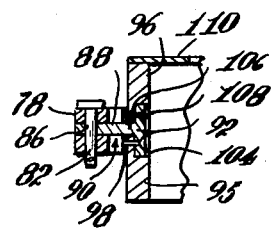
Figure 9:
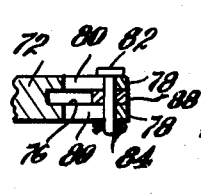
Figure 10:
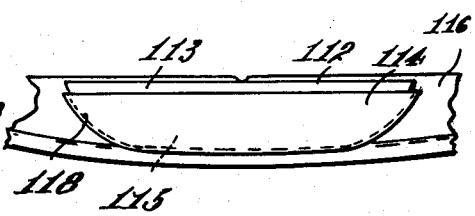
Figure 11:
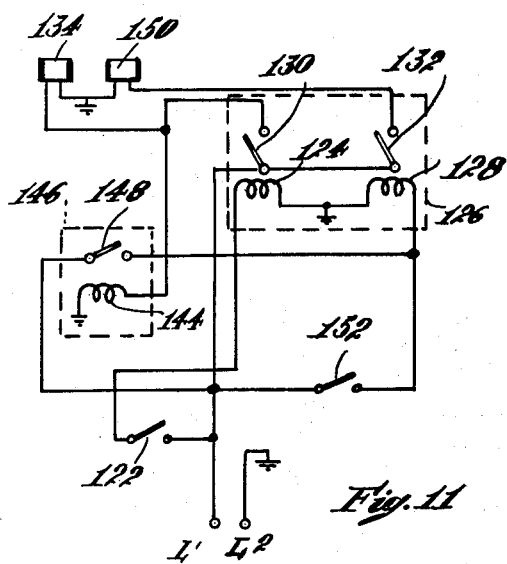
Figure 12:
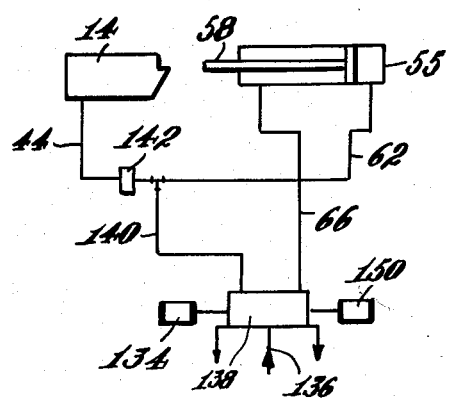

Reference is now had to the accompanying drawings wherein:

FIG. 1 is a plan view of the apparatus;
FIG. 2 is a side elevation of the apparatus partially in section taken along the line 2—2 of FIG. 1;
FIG. 3 is a top plan view of the block;
FIG. 4 is a side elevation view of the block;
FIG. 5 is a bottom plan view of the block;
FIG. 6 is a plan view of the clamp pad in open position with the block shown in phantom;
FIG. 7 is a view taken along the line 7—7 of FIG. 6;
FIG. 8 is a section taken along the line 8—8 of FIG. 6;
FIG. 9 is a section taken along the line 9—9 of FIG. 6;
FIG. 10 is a view of the upper and counter that are to be heated in the method and apparatus forming the instant invention;
FIG. 11 is a wiring diagram of the control for the apparatus; and
FIG. 12 is a diagram of the fluid pressure lines used in operating the apparatus.

As shown in FIGS. 1 and 2, the apparatus comprises a base 10 having a top plate 12. A block 14, made of a heat conductive material such as aluminum, is secured to the plate 12 by several threaded fasteners 16, one of which is shown in FIG. 2. Insulative spacers 18 are mounted on the fasteners 16 and interposed between the block 14 and the plate 12 to provide an air space between the block and the plate. The block has substantially planar bottom and top faces 20 and 22, an arcuate, convex rear face 24 corresponding in shape roughly to that of the heel end of a shoe last, planar side faces 26, and a planar front face 28.

The block has an indent in the shape of step 30 at its upper end having a tread 32 substantially parallel to the face 22 and a riser 34 substantially perpendicular to the face 22 (see FIG. 4). The step extends around the rear face 24 and along the side faces 26 merging with said side faces adjacent the front face 28. An air duct 36 runs beneath the top face 22 from the front face 28 to a position adjacent the rear face 24. The front end of the duct 36 is closed by a plug 38 threaded into the block 14. An air duct 40 extends upwardly from the bottom face 20 intersects the duct 36. A hollow nipple 42 is threaded into the block 14 at the bottom of the duct 40. The nipple 42 is connected to an air line 44 which in turn is connected to a source of air pressure (not shown). A plurality of air ports 46 extend from the duct 36 to the riser 34 of the step 30 and intersect the riser 34 at spaced intervals along its length. A pair of openings 48 intersect the bottom face of the block and extend upwardly thereof. Electric heating cartridges (not shown) are inserted in the openings 48 and are connected by wires 50 (FIG. 2) to a source of power. An opening 52 is also provided in the bottom of the block to accommodate a thermostat 53.

The cylinder 55 of an air operated motor 54 is mounted on an L-shaped bracket 56 which in turn is secured to the top plate 12. A piston rod 58 extends forwardly of the cylinder. Air entering the port 60 of the cylinder through a line 62 will project the piston forwardly of the cylinder, and air entering the cylinder through the port 64 from an air line 66 will retract the piston rod. A generally U-shaped rigid bar 68 is provided having a bight 70 and arms 72 extending forwardly of the bight. The bight 70 is rigidly connected to the piston rod 58. The forwardmost ends of the arms 72 diverge from each other to form arm extensions 74. Each arm extension is split by a longitudinal notch 76 extending from the forwardmost extremity of the arm extension to form fingers 78 that are separated by the notches 76 (see FIG. 9). Each finger has a slot 80 extending therethrough, the two slots 80 in each arm extension being in alignment. A headed pin 82 is slidably longitudinally of the slots 80 in each arm extension 74, and is retained in the slots by a cotter pin 84. Each pin 82 extends through a hole 86 in the leg 88 of a T-shaped bracket 90. The legs 88 are interposed between the fingers 78 and are slidable in the notches 76. Each bracket 90 has a flat base 92, the legs 88 projecting outwardly from the centers of the bases 92 at right angles to the bases.

A generally U-shaped clamping pad 94 having a pair of legs 95 and a bight 99 is located inwardly of the bar 68. The pad 94 is made of a heat-resistant flexible material such as leather and has an inwardly facing wall 96 that has a shape generally complemental to the shape of the walls 24 and 26 of the block 14 and a ledge 97 extending inwardly of the pad at the upper end of the wall 96 from the bight part-way along the legs 95. A U-shaped leaf spring 98 extends about the outer periphery of the pad 94. The spring 98 has a slot 100 at each of its outermost extremities to thereby form forks 102 that are divided by the slots 100 (see FIG. 7). Each pad leg 95 has a recess 104 in the wall 96 extending part-way through the thickness of the pad, and a slot 106 extending from the base of each recess 104 to the outer wall of the pad (see FIG. 8). The aforementioned bracket bases 92 are fitted within the recesses 104 with the bracket legs 88 extending through the slots 106 and 100. Threaded fastening elements 108 extend through aligned holes in the bracket bases 92, pad legs 95 and spring forks 102 to secure the spring forks to the pad legs. The spring 98 is so constructed as to yieldably urge the pad legs outwardly away from each other. The pad has a shield 110 secured to its upper surface that overhangs the wall 96.

As aforesaid the above described apparatus is intended to be used in carrying out the method described in pending application Serial No. 80,919, filed January 5, 1961. In said application there is disclosed a shoe upper 116 having a liner 114 united thereto by a seam 118 at the heel end of the upper, see FIG. 10. A shoe stiffener or counter 112 is inserted in the pocket formed between the upper 116 and the liner 114 with a portion 113 of the counter extending upwardly of the upper edge of the liner 114 as seen in FIG. 10. The counter material is made of a homogeneous thermoplastic material and has the characteristic of being stiff and rigid at ambient temperatures and of becoming soft and flaccid when heated above a predetermined temperature. The counter is coated with an adhesive which becomes sticky or tacky when heated above said predetermined temperature. The counter is coated with an adhesive which becomes sticky or tacky when heated above said predetermined temperature. One of the steps in said pending application is to heat the counter while it is in the pocket to the temperature required to soften the counter and render the adhesive tacky. In doing this, it is important that a solid heated surface not come in contact with the exposed portion 113 of the counter extending above the liner 114 as this will have a deleterious effect on the adhesive coated on the counter and may distort the counter, but no harm will result from having the solid heated surface contact the liner 114 to thereby heat the counter portion 115 within the pocket as the liner acts as a buffer in preventing the distortion of the counter. It is to provide means for heating all of the counter 112 while it is in the pocket that the method and apparatus forming the instant invention has been developed.

In the operation of the apparatus the block is heated by electric heating cartridges in the openings 48, the heat being controlled by the thermostat 52. The piston rod 58 is initially in retracted position to place the pad 94 away from the block 14. At this time the pad is in open position as indicated in FIG. 6, the spring 98 has caused the pad legs 95 to be drawn apart, and the pins 82 are at the forward ends of the slots 80 in the arm extensions 74. A shoe upper 116 having a counter 112 inserted in the pocket formed by the upper and the liner 114 is now draped around the block 14 as indicated in FIG. 2 with the liner in engagement with the surface 24 of the block and the exposed portion 113 of the counter opposite the step 30 of the block. The motor 54 is now operated to project the piston rod 58 to bring the pad 94 against the block, said motor and piston rod acting as a drive mechanism for this purpose. In this movement, the bight 99 of the pad will first contact the block as indicated in FIG. 6. Continued movement of the piston rod 58 will cause the pins 82 to ride up the inclined slots 80 to thereby force the pad legs 95 to overcome the force of the spring 98 and move toward each other against the block. The pins 82 and slots 80 thus act as a lost motion connection which enables the pad legs to be brought against the block after the bight of the pad has been brought to bear against the block. Concomitantly with the movement of the pad against the block, air is forced through the air line 44, the ducts 40 and 36, and the ports 46 and emerge in jets from the ports 46 to impinge against the counter portion 113 extending above the liner 114. In passing through the heated block 14, the air is heated an amount sufficient to soften the counter portion 113 without having any deleterious effects on the counter. At the same time the counter portion 115 is heated by the conduction of heat from the block 14 through the liner 114. During this period, the ledge 97 bends the counter portion 113 and the portion of the upper 116 lying behind the counter portion 113 so as to form a crease in the counter and upper along which the counter and upper will be subsequently folded in a heel seat lasting and counter molding step described in the above referred to pending application. The shield 110 serves to entrap the hot air emanating from the ducts 46 so that it is not dissipated in the surrounding atmosphere but is concentrated against the counter portion 113. After a predetermined time interval the motor 54 is actuated to retract the piston rod 58 to withdraw the pad 94 from the block 14 and release the work. Concomitantly with the retraction of the pad, air ceases to flow through the ducts 40, 36 and the ports 46. The shoe upper and softened counter are now taken off the block 14 so that the next step in the method described in the above cited pending application may be carried out.

The electrical control circuit shown in FIG. 11 and the air pressure circuit shown in FIG. 12 may be utilized in connection with the apparatus to carry out the above described operation. The momentary closing of a switch 122, which is operated by a foot pedal (not shown), sends current from a power source labelled L1, L2 to the latch coil 124 of a latch relay 126. The relay 126 is a conventional latch relay having the latch coil 124, a release coil 128, a normally open switch 130 and a normally closed switch 132. The relay is so constructed that when the coil 124 is pulsed the switch 130 closes and the switch 132 opens, and when the coil 128 is pulsed the switch 130 opens and the switch 132 closes. The aforementioned pulsing of the coil 124 therefore closes the switch 130 and opens the switch 132. Current now passes from the power source through the switch 130 to the solenoid 134.

Energization of the solenoid 134 causes air to pass from a supply line 136 (see FIG. 12) through a four way valve 138, into a line 140, through the aforementioned line 62, into the cylinder 55 to project the piston rod 58 and bring the clamping pad 94 against the heated block 14 in the manner described above. Air at the same time passes from line 140, through a restrictor valve 142, through the aforementioned line 44, and into the block 14 to thereby eject heated air through the ports 46.

At the same time that the solenoid 134 is energized, the coil 144 of a timer 146 is energized. The timer 146 is a commercial item that has the aforementioned coil 144 and a normally open switch 148. It is so constructed that a predetermined time after the coil 144 is energized the switch 148 is closed. The closing of the switch 148 causes current to pass therethrough from the power source to pulse the coil 128. The pulsing of the coil 128 causes the switch 132 to close and the switch 130 to open.

The opening of the switch 130 deenergizes the solenoid 134 and the coil 144. The deenergization of the coil 144 returns the switch 148 to its normally open position thereby deenergizing the coil 128. Thus there is only a momentary pulse sent through the coil 128. The closing of the switch 132 causes the energization of the solenoid 150 concurrently with the deenergization of the solenoid 134. This causes air to cease flowing through the line 140 and to pass from the supply line 136, through the valve 138, through the aforementioned line 66, and into the cylinder 55 to retract the piston rod 58.

Should it be found desirable to retract the piston rod 58 prior to the lapse of the predetermined time interval set by the timer 146, the normally open switch 152 is closed momentarily and then opened to cause a pulsing of the release coil 128 independently of the pulsing caused by the closing of the timer switch 148.

It should be understood that the present disclosure is for the purpose of illustration only and that this invention includes all modifications and equivalents which fall within the scope of the appended claims.

I claim:

1. The method of heating a shoe stiffener that is rigid at ambient temperature and that becomes flaccid when heated to a predetermined temperature, while the stiffener is positioned in a pocket formed between a shoe upper and a liner, with an exposed portion of the stiffener projecting above the liner and the remainder of the stiffener concealed within the pocket, comprising: bringing a heated surface into contact with the liner to heat the concealed stiffener portion; and bringing a heated gaseous media into contact with the exposed portion of the stiffener.

2. The method of heating a shoe stiffener that is rigid at ambient temperature and that becomes flaccid when heated to a predetermined temperature, while the stiffener is positioned in a pocket formed between a shoe upper and a liner, with an exposed portion of the stiffener projecting above the liner and the remainder of the stiffener concealed within the pocket, comprising: pressing the liner against a heated surface to heat the concealed stiffener portion; and concomitantly projecting a heated gaseous media against the exposed portion of the stiffener.

3. The method of heating a shoe stiffener that is rigid at ambient temperatures and that becomes flaccid when heated to a predetermined temperature, while the stiffener is positioned in a pocket formed between a shoe upper and a liner, with an exposed portion of the stiffener projecting above the liner and the remainder of the stiffener concealed within the pocket, comprising: pressing the liner against a heated surface to heat the concealed stiffener portion; concomitantly projecting heated air against the exposed portion of the stiffener; maintaining the pressure on the liner and the projection of heated air for a predetermined time interval; and concomitantly releasing the pressure against the liner and the projection of the heated air.

4. An apparatus for heating a shoe stiffener positioned in a pocket formed between a shoe upper and a liner, with an exposed portion of the stiffener projecting above the liner and the remainder of the stiffener concealed within the pocket, comprising: a heatable block having a face adapted to contact the liner and heat the said remainder by conduction through the liner; an indent extending inwardly of said face so as to be located spatially from said exposed portion; and at least one port in said indent through which heated air is adapted to flow and be projected against the exposed stiffener portion.

5. An apparatus for heating a shoe stiffener positioned in a pocket formed between a shoe upper and a liner, with an exposed portion of the stiffener projecting above the liner and the remainder of the stiffener concealed within the pocket, comprising: a block having an arcuate surface; heating means located within the block and thereby heating the said remainder by conduction through the liner for heating the block; and an indent extending inwardly of said surface so as to be located spatially from said exposed portion, said indent being located contiguous to said surface; at least one port in said block intersecting said indent; a duct in said block intersecting said port; and means for forcing heated air through said duct whereby the heated air is ejected through said port to thereby heat said exposed portion.

6. An apparatus for heating a shoe stiffener positioned in a pocket formed between a shoe upper and a liner, with an exposed portion of the stiffener projecting above the liner and the remainder of the stiffener concealed within the pocket, comprising: a block having an arcuate rear face and a top face; a step in said block extending inwardly of said rear face positioned between the rear face and the top face, said step having a tread intersecting the rear face and extending in a direction substantially parallel to the top face and a riser intersecting the top face and extending in a direction substantially normal to the top face so as to be located spatially from said exposed portion; a plurality of ports in said block intersecting said riser at spaced intervals; a duct in said block intersecting each of said ports at the ends of the ports remote from the riser; means for heating said block to thereby heat the said remainder by conduction through the liner; and means for forcing heated air into said duct, whereby the heated air is ejected through said ports to thereby heat said exposed portion.

7. A shoe stiffener heating apparatus comprising: a heated block; at least one port in said block through which gas is adapted to flow; a clamping pad mounted for relative movement with respect to said block; and means for concomitantly forcing gas through said port and imparting relative movement of the pad and block toward each other.

8. The apparatus according to claim 7 including means for concomitantly separating the pad and block and stopping the flow of gas a predetermined time after the initiation of the last mentioned means.

9. A shoe stiffener heating apparatus comprising: a block having an arcuate surface; means for heating the block; an indent extending inwardly of said surface located contiguous to said surface; at least one port in said block intersecting said indent; means connecting said port to a source of air pressure; a clamping pad mounted for relative movement with respect to said arcuate surface; an air operated motor for effecting said relative movement; valve means; first air line means extending from the valve means to the port; second air line means extending from the valve means to the motor; and means for actuating the valve means to permit the flow of air from said source through said port by way of said first air line means and to concomitantly supply air to said motor from said source by way of said second air line means to operate said motor to impart relative movement of the block and pad toward each other.

10. The apparatus according to claim 9 having means for actuating said valve means to concomitantly shut off the air to said block and to operate said motor to separate the block and pad a predetermined time after the initiation of the last mentioned means.

11. A shoe stiffener heating apparatus comprising: a base; a block mounted on said base; said block having an arcuate rear face and a top face; a step in said block extending inwardly of said rear face positioned between the rear face and the top face, said step having a tread intersecting the rear face and extending in a direction substantially parallel to the top face and a riser intersecting the top face and extending in a direction substantially normal to the top face; a plurality of ports in said block intersecting said riser at spaced intervals; a duct in said block intersecting each of said ports at the ends of the ports remote from the riser; means for heating said block; an air operated motor comprising a piston rod and cylinder mounted on said base; a clamping pad connected to said piston rod, said piston rod and pad being mounted for movement towards and away from said arcuate face; a valve; a pair of air lines connecting said valve to the cylinder to respectively enable the piston rod to be projected out of the cylinder and to be retracted into the cylinder; a third air line connecting said valve to said duct; a valve controlling relay; a timer; a switch; means interconnecting the valve and relay operative in response to the closing of said switch to cause the relay to actuate the valve so that air concomitantly passes through the valve into one of said pair of air lines to project the piston rod and pad toward the arcuate face of the block and passes through said ports by way of said duct and third air line; and means interconnecting the timer, valve and relay operative a predetermined time after the closing of said switch to actuate the valve so that air passes through the other of said pair of air lines to retract the piston rod and pad away from the arcuate face and to shut off the supply of air to said third air line.

12. A shoe stiffener heating apparatus comprising: a block having a convex face; a substantially U-shaped pad having a bight and a pair of legs extending forwardly of the bight on opposite sides of the bight; spring means connected to said pad legs to yieldably urge the pad legs apart; drive means; an arm positioned adjacent each pad leg; means connecting said arms to said drive means; a lost motion connection between each arm and each pad leg; and means for imparting movement to said drive means whereby the bight of the pad first bears against said convex face and then the lost motion connection is taken up to cause the pad legs to overcome the spring means and bear against the block.

13. A shoe stiffener heating apparatus comprising: a block having a convex face; a substantially U-shaped pad having a bight and a pair of legs extending forwardly of the bight on opposite sides of the bight; a substantially U-shaped spring extending about the outer periphery of the pad and connected to said pad legs to yieldably urge the pad legs apart; a generally U-shaped bar having a bight and a pair of arms extending forwardly of the bight on opposite sides of the bight positioned exteriorly of said pad and spring; a lost motion connection between said bar arms and said pad legs so constructed as to enable the spring means to urge the pad legs apart to the extent permitted by the lost motion connection; a drive rod connected to the bight of said bar mounted for movement toward and away from said convex face to thereby move the bar and pad accordingly; and means for moving the drive rod toward the convex face whereby the bight of the pad first bears thereagainst and then the lost motion connection is taken up to cause the pad legs to overcome the spring force and bear against the block.

14. The apparatus according to claim 13 wherein said lost motion connection comprises: a divergent arm extension at the extremity of each bar arm; a slot extending through each of said arm extensions; a bracket leg connected to each pad leg and extending outwardly of each pad leg and the spring toward an arm extension; and a pin mounted in each bracket leg and slidably guided in the slot of its associated arm extension.

15. An apparatus for heating work comprising a shoe stiffener positioned in a pocket formed between a shoe upper and a liner, with an exposed portion of the stiffener projecting above the liner and the remainder of the stiffener concealed within the pocket, comprising: a heatable block having a face adapted to contact the liner; an indent extending inwardly of said face; at least one port in said indent through which heated gas is adapted to flow and be projected against the opposed exposed stiffener portion; and a pad adapted to clamp the work against the block mounted for relative movement with respect to the block toward and away from the block, said pad having a wall opposed to said block face and said indent, the portion of said wall opposed to said block face being generally complemental to said block face and the portion of said wall opposed to said indent being spaced from said indent when the block and pad are in contiguous clamping relation, whereby the work may be held by the pad against the block with said remainder clamped between the block face and the pad wall and said exposed portion spaced from said indent.

16. An apparatus for heating work comprising a shoe stiffener positioned in a pocket formed between a shoe upper and a liner, with an exposed portion of the stiffener projecting above the liner and the remainder of the stiffener concealed within the pocket, comprising: a block having an arcuate face adapted to contact the liner; heating means located within the block for heating the block; an indent extending inwardly of said face located contiguous to said face; at least one port in said block intersecting said indent; a duct in said block intersecting said port; means for forcing heated air through said duct whereby the heated air is ejected through said port to impinge against the exposed stiffener portion; a pad adapted to clamp the work against the block mounted for relative movement with respect to the block toward and away from the block, said pad having a wall opposed to said block face and said indent, the portion of said wall opposed to said block face being generally complemental to the block face and the portion of said wall opposed to said indent being spaced from said indent when the block and pad are in contiguous clamping relation, whereby the work may be held by the pad against the block with said remainder clamped between the block face and the pad wall and said exposed portion spaced from said indent; and a ledge on the portion of the pad wall opposed to said indent for forming a crease in the upper and the exposed stiffener portion.

17. An apparatus for heating work comprising a shoe stiffener positioned in a pocket formed between a shoe upper and a liner, with an exposed portion of the stiffener projecting above the liner and the remainder of the stiffener concealed within the pocket, comprising: a block having an arcuate face adapted to contact the liner;

heating means located within the block for heating the block; an indent extending inwardly of said face located contiguous to and above said face; at least one port in said block intersecting said indent; a duct in said block intersecting said port; means for forcing heated air through said duct whereby the heated air is ejected through said port to impinge against the exposed stiffener portion; a pad adapted to clamp the work against the block mounted for relative movement with respect to the block toward and away from the block, said pad having a wall opposed to said block face and indent, the portion of said wall opposed to said block face being generally complemental to the block face and the portion of said wall opposed to said indent being spaced from the indent when the block and pad are in closed clamping relation, whereby the work may be held by the pad against the block with said remainder clamped between the block face and the pad wall and said exposed portion spaced from said indent; and a shield at the upper end of said pad extending over said indent when the block and pad are in said closed relation to entrap the air ejected from said port.

18. An apparatus for heating a shoe stiffener positioned in a pocket formed between a shoe upper and a liner, with an exposed portion of the stiffener projecting above the liner and the remainder of the stiffener concealed within the pocket, comprising: a block having a face adapted to contact the liner; means for heating the block and thereby heating the said remainder by conduction through the liner; an indent extending inwardly of said face, so as to be located spatially from said exposed portion; and means for providing a heated gaseous media in said indent that is adapted to impinge against and thereby heat said exposed portion.

19. An apparatus for heating work comprising: a shoe stiffener positioned in a pocket formed between a shoe upper and a liner, with an exposed portion of the stiffener projecting above the liner and the remainder of the stiffener concealed within the pocket, comprising: a block having a face adapted to contact the liner; means for heating the block and thereby heating the said remainder by conduction through the liner; an indent extending inwardly of said face; means for providing a heated gaseous media in said indent that is adapted to bear against and thereby heat said exposed portion; and a pad adapted to clamp the work against the block mounted for relative movement with respect to the block toward and away from the block, said pad having a wall opposed to said block face and indent, the portion of said wall opposed to said block face being generally complemented to said block face and the portion of said wall opposed to said indent being spaced from said indent when the block and pad are in contiguous clamping relation, whereby the work may be held by the pad against the block with said remainder clamped between the block face and the pad wall and said exposed portion spaced from said indent.

References Cited in the file of this patent

UNITED STATES PATENTS

| | | |
|---|---|---|
| 346,100 | Hatch | July 27, 1886 |
| 1,326,112 | Stubbs | Dec. 23, 1919 |
| 2,271,682 | Dodge | Feb. 3, 1942 |
| 2,575,436 | Woodman | Nov. 20, 1951 |
| 2,694,819 | Diessel | Nov. 23, 1954 |

FOREIGN PATENTS

| | | |
|---|---|---|
| 488,453 | Great Britain | July 7, 1938 |
| 656,442 | Great Britain | Aug. 22, 1951 |
| (Corresponding to U.S. 2,460,940, February 8, 1949.) | | |
| 735,362 | Great Britain | Aug. 17, 1955 |